Nov. 17, 1931.  W. HILDEBRAND  1,832,391
SINGLE CHAMBER COMPRESSED AIR BRAKE
Filed Dec. 3, 1928

Inventor
Wilhelm Hildebrand

Patented Nov. 17, 1931

1,832,391

UNITED STATES PATENT OFFICE

WILHELM HILDEBRAND, OF BERLIN, GERMANY

SINGLE CHAMBER COMPRESSED AIR BRAKE

Application filed December 3, 1928, Serial No. 323,395, and in Germany March 15, 1928.

This invention relates to single chamber compressed air brakes of the kind having two control valves directly operated by pressure variations in the train pipe, one of the said control valves being mainly intended for controlling the filling of the brake cylinder when applying the brake and the other mainly intended for controlling the exhausting of the air from the brake cylinder when releasing the brake. In known single chamber brakes of this kind, if there are any compressed air losses in the brake cylinder such losses cannot be replaced, and the chief object of the present invention is to eliminate this disadvantage.

The expression "single chamber compressed air brake" denotes a brake in which compressed air is supplied only to the chamber or air space in front of the piston in the brake cylinder to move the piston to apply the brake, the piston being returned into the brake release position by a spring when the air pressure in this chamber is reduced, as distinguished from "double chamber" brakes wherein compressed air acts on both the front and back of the piston, the movements of the piston being controlled by varying the pressure in the respective chambers which are separated by the piston.

According to the invention only one of the two control valves, which are coupled in parallel and are directly influenced by the pressure variations in the train pipe, is also subjected to the pressure in an auxiliary air reservoir, while the other valve is also subjected to the pressure developing in the brake cylinder and to a third approximately constant force or pressure, such as is known with single chamber brakes that have only one control valve. The brake according to the invention possesses, as compared with the single chamber brake with two control valves connected in series, of which only one valve is directly influenced by the pressure in the train pipe, the advantage of a quicker response of the secondary control valve.

In order that the said invention may be clearly understood and readily carried into effect, the same will now be described more fully with reference to the accompanying drawings or diagrams illustrating two alternative constructional embodiments of the invention.

A indicates a control chamber under approximately constant pressure, B an auxiliary air reservoir, C the single chamber brake cylinder, L the train pipe, $St^1$ the control valve exposed to the pressure of the train pipe and of the reservoir B, $St^2$ the control valve governed by the train pipe and brake cylinder pressure and by a third force or pressure, namely the approximately constant pressure of the control chamber A, which latter valve is connected in parallel with the first named control valve $St^1$ to the train pipe L. A transfer or expansion chamber U is arranged to be opened and closed by the movements of the control valve $St^1$. The exhaust opening to the atmosphere through which air escapes when the brake is released is indicated at $o^1$.

Figure 1:
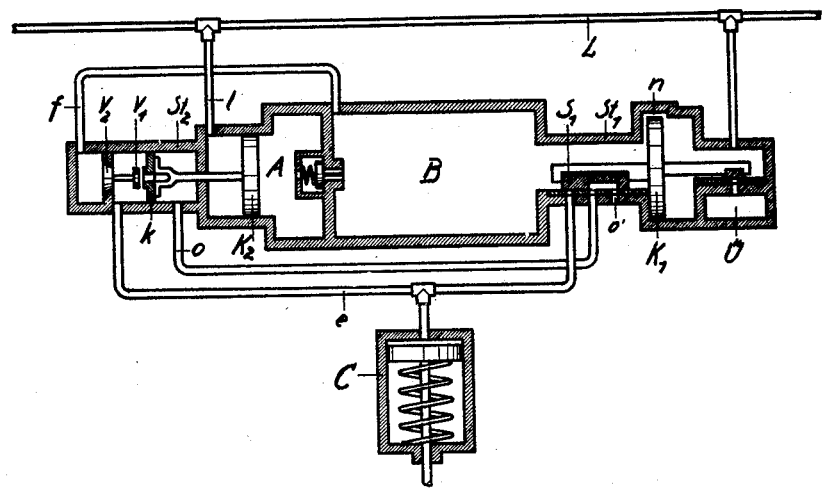
Fig. 1 represents one example of apparatus in longitudinal section.

In the construction represented in Figure 1, wherein braking a fall in pressure occurs in the train pipe L, the control pistons $K^1$, $K^2$ are simultaneously displaced in opposite directions, or according to the direction of the reduced train pipe pressure. The slide valve $S^1$ thereby shuts off the pipe O from the exhaust opening $o^1$ and uncovers the opening of the pipe $e$ so that compressed air flows from the reservoir B into the brake cylinder C. By the advance of the piston $K^2$ the central bore in the piston $k$ controlled by the control piston $K^2$ is first closed by the valve $V^1$ and the communication in the control valve $St^2$ between the pipes $e$ and O is thus shut off, then the valve $V^2$ is moved from its seat by the control piston $K^2$ to establish a connection through the pipes $f$ and $e$ from the reservoir B to the brake cylinder C, so that air now flows to the brake cylinder C by two paths from the reservoir B. If the pressure in the reservoir B falls below the reduced pressure in the train pipe L, the control piston $K^1$ returns to the release position, but escape of air from the brake cylinder C is prevented because the valve V¹ keeps the bore in the piston $k$ closed. The increasing brake pressure finally effects a return movement of the pistons $k$ and K² until the valve V² closes. The braking adjustment is thus retained. Should the pressure in the brake cylinder fall owing to leakage at the piston, then the pistons $k$ and K² again advance so that the valve V² is re-opened, and the pressure in the brake cylinder remains at the level fixed by the pressure in the pipe. Pressure losses in the reservoir B are replaced through the filling groove $n$ in the control valve S$t^1$. If after a braking operation the pressure in the pipe L increases, so as to diminish the braking effect, the pistons K² and $k$ are so displaced that the valve V¹ uncovers the hole in the piston $k$, placing the pipe $e$ in communication with the pipe O, which latter is placed in communication by the movement of the slide valve S¹ with the outlet $o^1$ open to the atmosphere; the reduction of pressure in front of the piston $k$ then allows this piston and the piston K² to advance so that the bore of the piston $k$ is again closed by the valve V¹.

Figure 2:
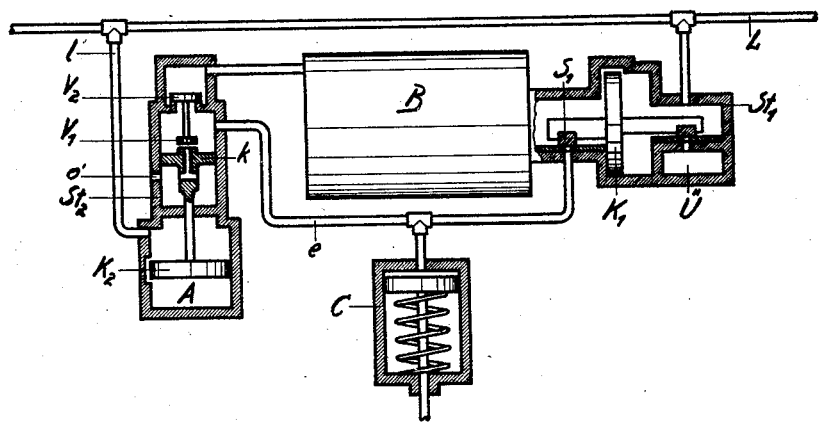
Fig. 2 represents another example of apparatus in longitudinal section.

The construction illustrated in Figure 2 differs from that of Figure 1 in that the control chamber A is not filled from the reservoir B, but directly from the train pipe L through the branch pipe $l^1$, and that the exhausting of the brake cylinder during stepwise or complete release is governed by that control valve which is influenced by the train pipe and brake cylinder pressure, and by a third force or pressure, which in this example is the approximately constant pressure in the control chamber A. The exhaust aperture $o^1$ is located in the housing of the control valve S$t^2$. The braking operation is essentially the same as in the construction according to Figure 1, except that the opening and closing of the exhaust aperture $o^1$ is not effected by the control slide valve S¹. When releasing the brake, the air from the brake cylinder escapes directly through the said aperture into the atmosphere. As in Figure 1 the valve S$t^1$, which is only influenced by the pressures in the train pipe L and reservoir B, controls the inlet to a transfer or expansion chamber U.

What I claim and desire to secure by Letters Patent of the United States is:—

1. In combination with a train pipe, a brake system including an auxiliary reservoir, a brake cylinder, a distributing valve, means communicating said valve with the train pipe and the auxiliary reservoir whereby said valve is influenced on one side by the train pipe pressure and on the other side by the auxiliary reservoir pressure, said valve in the release position communicating the train pipe with the auxiliary reservoir and in the brake position communicating the auxiliary reservoir with the brake cylinder, a controlling chamber, a second distributing valve influenced by the substantially constant pressure in said controlling chamber, by the variable pressure of the train pipe and by the pressure in the brake cylinder to control both the filling and the exhausting of the brake cylinder.

2. In combination with a train pipe, a brake system including an auxiliary reservoir, a control chamber and brake cylinder, means establishing communication between the train pipe and the auxiliary reservoir and the control chamber, a control valve for exhausting the brake cylinder, said control valve being influenced by the brake cylinder pressure and by the pressure in the train pipe and the substantially constant pressure in the control chamber, another control valve for controlling the filling of the brake cylinder, said last named control valve being influenced by pressure in the train pipe and in the auxiliary reservoir, and separate means controlled by the first named control valve for conducting the air from the auxiliary reservoir to the brake cylinder.

3. In combination with a train pipe, a brake system including an auxiliary reservoir, a brake cylinder, a control chamber, valves directly operable by pressure variations in said pipe and connected thereto in parallel, one of said valves being exposed to pressure in said reservoir tending to actuate said valve to open communication from said reservoir to said cylinder to apply the brake, the other of said valves controlling the exhausting of the brake cylinder and being exposed to brake cylinder pressure and to an approximately constant pressure in the control chamber.

4. In combination with a train pipe, a brake system including an auxiliary reservoir, a brake cylinder, means influenced by the pressure in said pipe to establish communication between said reservoir and said cylinder to apply the brake, a control chamber, a valve to control the exhausting of the brake cylinder, said valve being influenced by the train pipe pressure, the brake cylinder pressure, and by the approximately constant pressure in said control chamber.

5. In combination with a train pipe, a brake system including an auxiliary reservoir, a brake cylinder, a control chamber in direct communication with said train pipe, a valve in said chamber operable by differences of pressure between said train pipe and said reservoir, said valve being adapted to establish communication between said reservoir and said cylinder to apply the brake, a second control chamber, a valve in said second chamber controlling the exhausting of the brake cylinder to the atmosphere, said last named valve being influenced by the train pipe pressure, the brake cylinder pressure and approximately constant pressure in said second chamber.

6. In compressed air brake apparatus, a train pipe, a brake system including an auxiliary reservoir, a brake cylinder, and a primary control valve of known type, in combination with a secondary control valve in a control chamber and connections whereby said secondary control valve is influenced by the train pipe pressure, the brake cylinder pressure and by the approximately constant pressure in said chamber to control the exhausting of the brake cylinder in cooperation with said primary control valve.

WILHELM HILDEBRAND.